(Model.)　　　　　　　　　　　　　　　　　　　6 Sheets—Sheet 1.
W. P. UHLINGER.
Jacquard Apparatus for Looms.
No. 230,591.　　　　　　　　　Patented July 27, 1880.

WITNESSES　　　　　　　　　　　　　　　INVENTOR.

(Model.) 6 Sheets—Sheet 2.

W. P. UHLINGER.
Jacquard Apparatus for Looms.

No. 230,591. Patented July 27, 1880.

(Model.) 6 Sheets—Sheet 3.

W. P. UHLINGER.
Jacquard Apparatus for Looms.

No. 230,591. Patented July 27, 1880.

WITNESSES

INVENTOR.
Wm P. Uhlinger.

ATTORNEYS.

(Model.) 6 Sheets—Sheet 4.

W. P. UHLINGER.
Jacquard Apparatus for Looms.

No. 230,591. Patented July 27, 1880.

WITNESSES
INVENTOR
ATTORNEYS (Model.) 6 Sheets—Sheet 5.
W. P. UHLINGER.
Jacquard Apparatus for Looms.
No. 230,591. Patented July 27, 1880.
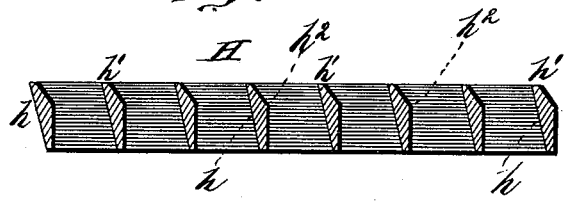
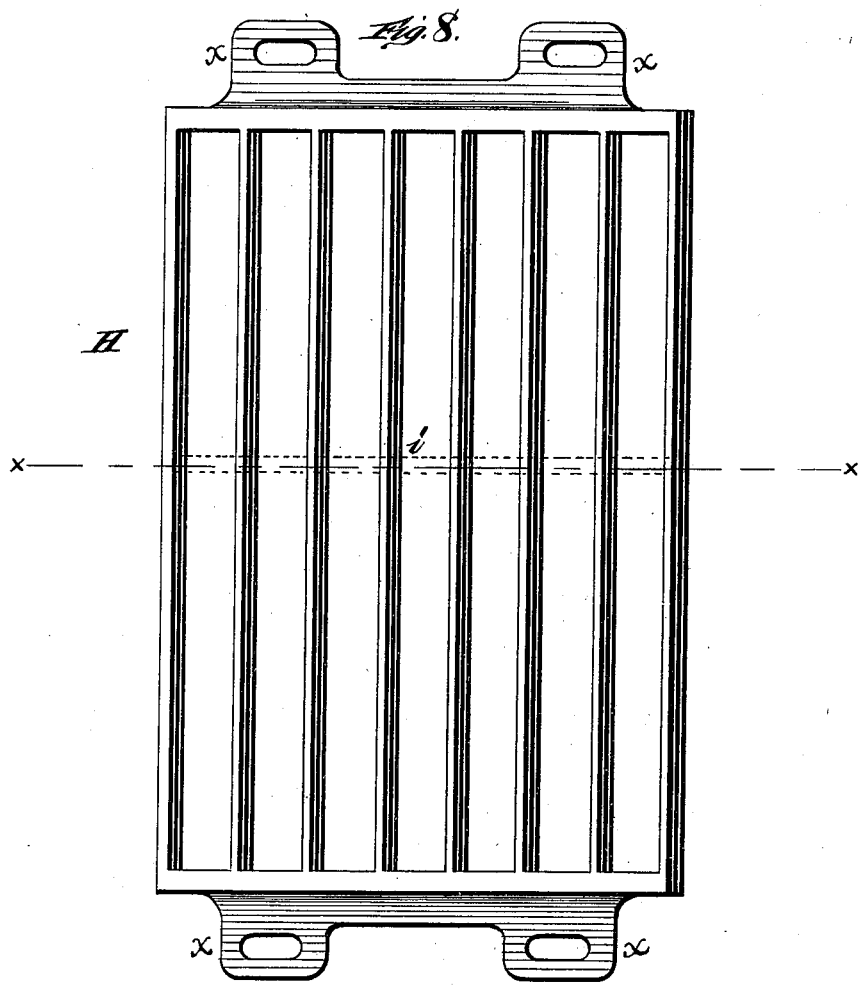
WITNESSES  
INVENTOR  
ATTORNEYS (Model.) 6 Sheets—Sheet 6.
W. P. UHLINGER.
Jacquard Apparatus for Looms.
No. 230,591. Patented July 27, 1880.
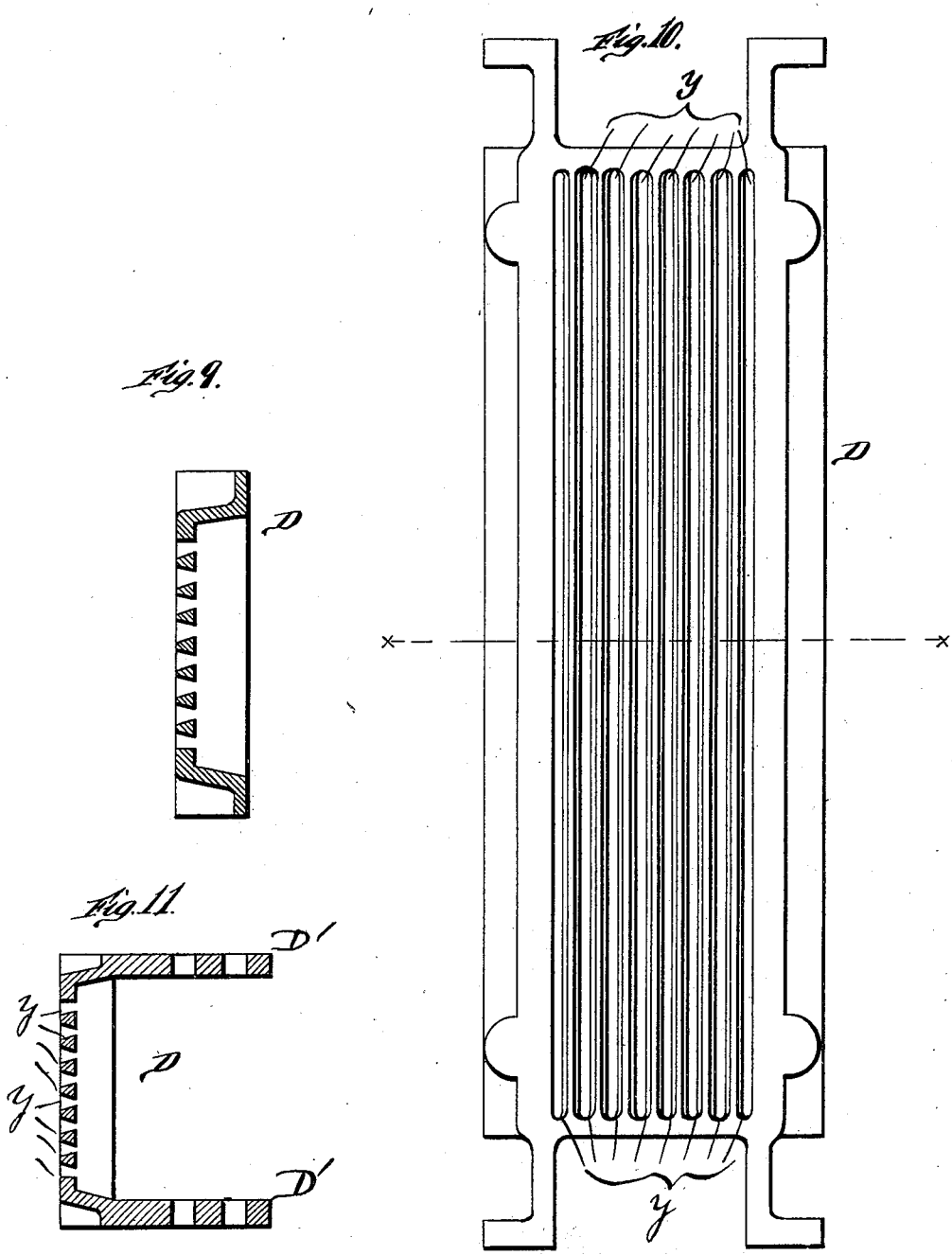

UNITED STATES PATENT OFFICE.

WILLIAM P. UHLINGER, OF PHILADELPHIA, PENNSYLVANIA.

JACQUARD APPARATUS FOR LOOMS.

SPECIFICATION forming part of Letters Patent No. 230,591, dated July 27, 1880.

Application filed April 23, 1880. (Model.)

*To all whom it may concern:*

Be it known that I, WILLIAM P. UHLINGER, of Philadelphia, in the county of Philadelphia and State of Pennsylvania, have invented a new and valuable Improvement in Jacquard Apparatus for Looms; and I do hereby declare that the following is a full, clear, and exact description of the construction and operation of the same, reference being had to the annexed drawings, making a part of this specification, and to the letters and figures of reference marked thereon.

Figure 1:
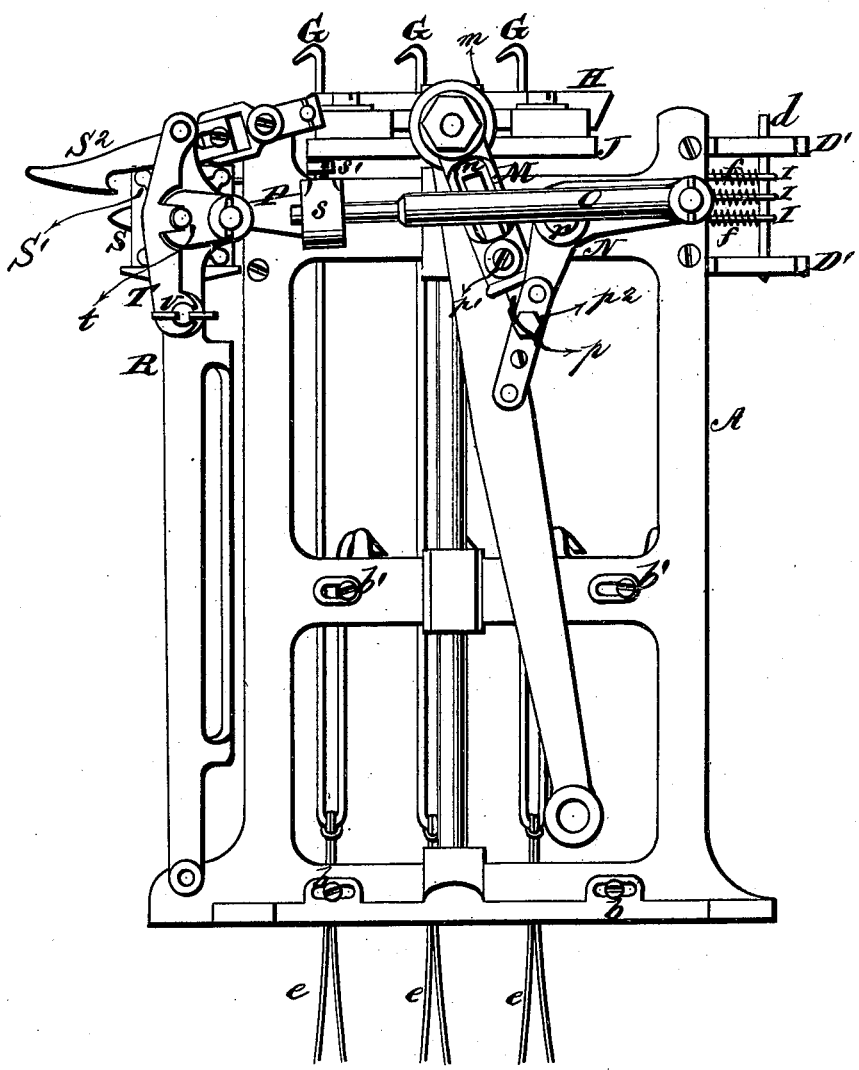
Figure 2:
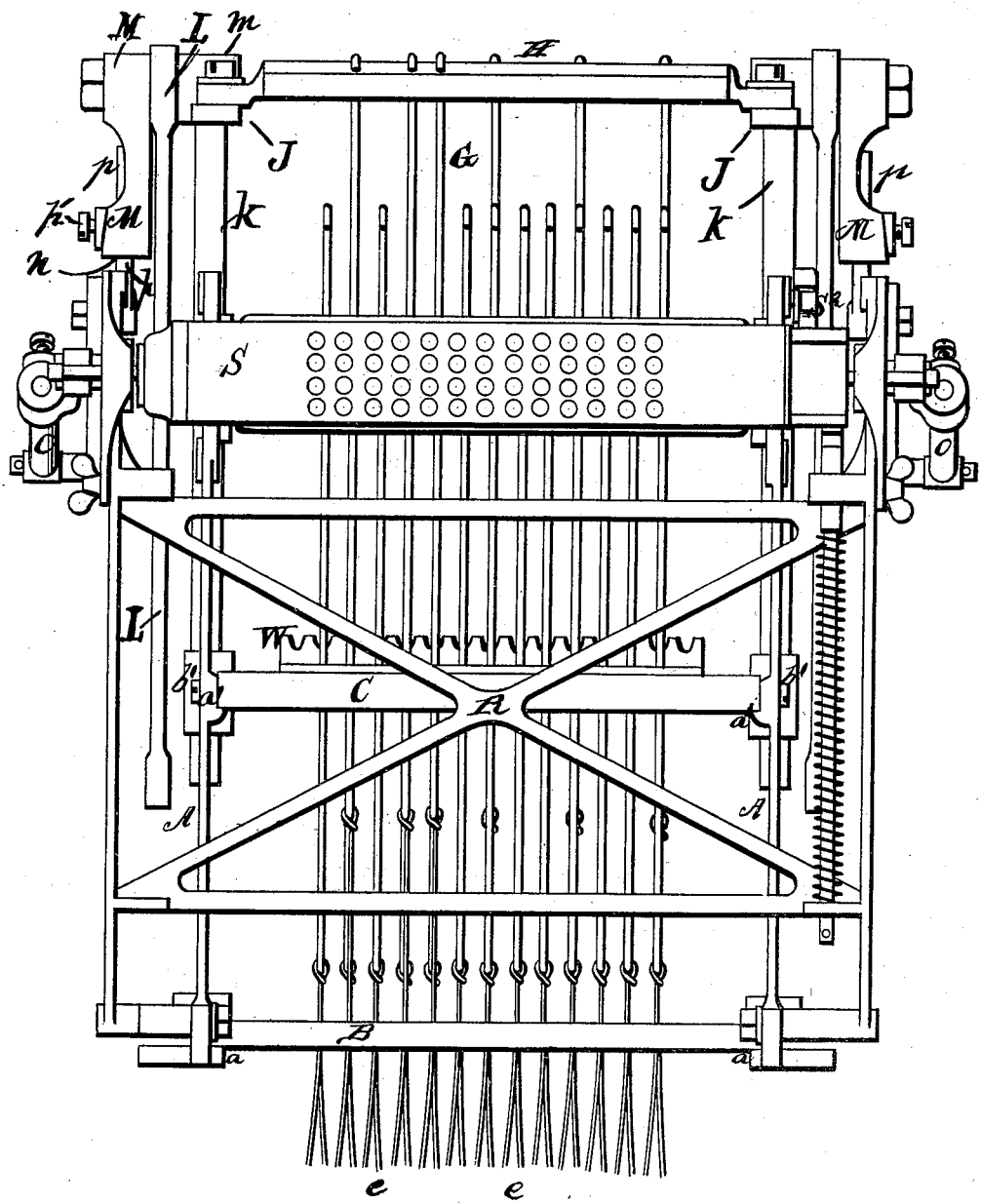
Figure 3:
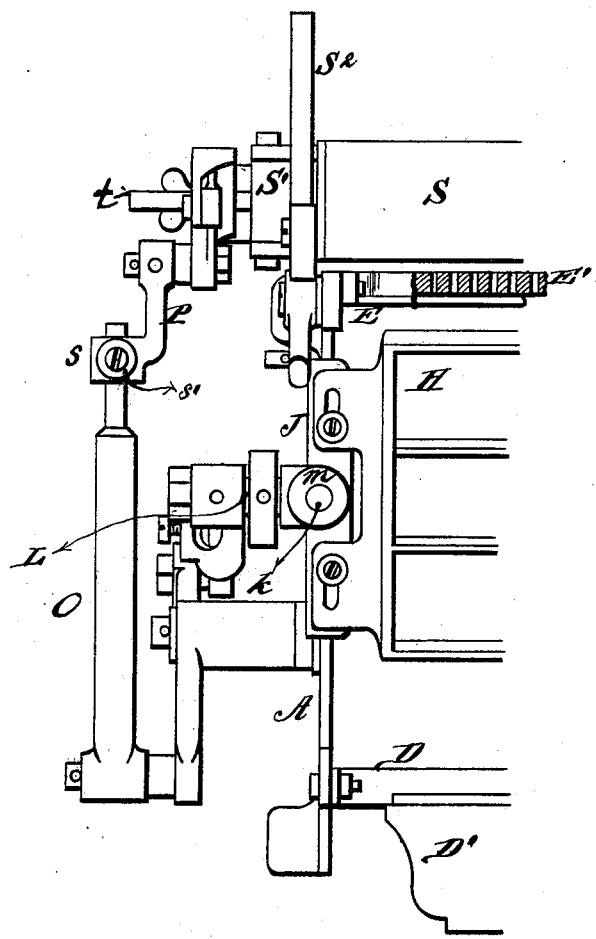
Figure 4:
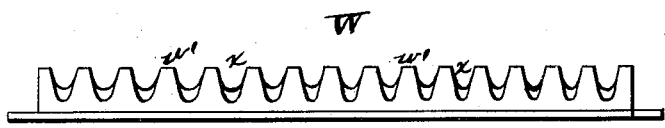

Figure 1 of the drawings is an end view of the machine, showing the griff let down. Fig. 2 is a back view of the same, showing the griff raised. Fig. 3 is a sectional plan view, and Figs. 4, 5, 6, 7, 8, 9, 10, and 11 are detail views.

The nature of my invention consists in a Jacquard machine for looms, as will be hereinafter more fully set forth, and pointed out in the claims.

The annexed drawings, to which reference is made, fully illustrate my invention.

The frame of my Jacquard machine is composed of two end frames or end pieces, A A, each cast in suitable form and connected at the bottom by a perforated board or plate, B, inserted between flanges $a\ a$ on the inner sides of said end pieces, and fastened by screws $b\ b$ passing through slots in the end pieces, as shown.

The frame C, while it connects and braces the end pieces, also forms a support for the hook-support, hereinafter described.

At the top the end pieces, A A, are connected, on the rear side, with a cast-metal frame, E, which is provided or formed with a perforated board or plate, E', and on the front side, at the top, the end pieces are connected by the spring box or frame D, said box or frame being on its outer side provided with two horizontal boards or plates, D' D', having narrow mortises made through them for the passage of the keys $d\ d$.

G G are the hooks, provided with strings $e\ e$ at their lower ends to connect with the heddles of the loom.

I I are the horizontal rods, each bent or formed with an eye, through which a hook passes, and each rod provided with a spring, $f$, bearing against a key, $d$.

The hooks, rods, springs, and keys are constructed and operate in precisely the same manner as in the ordinary Jacquard machine, and hence need no further description here.

H represents the lifting-frame or griff of the machine. Ordinarily this has been made of a cast-iron lifting-frame provided with sheet-metal end pieces with a series of parallel inclined slots, through which are passed strips, said strips being fastened in the end pieces. I make this lifting-frame of cast-iron, the longitudinal bars of said frame being in the form shown in Fig. 7—that is to say, the back of each bar forms a straight incline at such angle that it will, in the downward movement of the frame, press back the hooks without any injury to them. This rear inclined side is marked $h$. The top of each bar has a horizontal narrow edge, $h'$, and then the bar is inclined on the front side to $h^2$, from which point it inclines rearward again, making, as it were, the front of the bar of double-incline form, or, in other words, thick at or near the center and tapering toward both top and bottom edges. This construction renders the frame strong and firm without any material increase in the weight or sacrifice of space.

Where the frame H is made very long it may have at suitable intervals cross-pieces or cross-bars cast in to strengthen the frame, as represented by dotted lines $i$ in Fig. 8.

The frame H is at each end secured to a cross-head, J, fastened to a vertical rod, $k$, which passes through suitable boxes or guides formed in the end pieces, A, of the main frame. The cross-head J is provided in the center with an outwardly-projecting stud, $m$, upon which is placed a connecting-rod, L. The lower end of this rod is to connect with the inner end of a long lever at the side of the loom, and this latter lever to be worked or rocked on its pivot, by a cam or other means, from the mechanism of the loom, so as to raise and lower the hook-lifting frame H at the proper times.

On the stud $m$ is further loosely placed an arm, M, which hangs downward, and has a socket, $n$, formed in its lower end. In this socket is inserted a pin, $p$, which is adjusted therein, and fastened at any point desired by a set-screw, $p'$.

From the lower end of the pin $p$, at right angles thereto, projects a short pin, $p^2$, (see Fig. 1,) which is passed through one of the holes in a perforated arm of an elbow or bell-crank lever, N, placed upon a stud, $r$, fastened in the end piece, A, of the main frame. In the other arm of this lever N is a projecting stud, upon which is placed a pitman, O. The other end of this pitman is inserted in a socket, $s$, formed in the end of an arm, P, and held at any point desired by a set-screw, $s'$.

The arm P is mounted on a stud projecting from the side near the upper end of a frame, R, which is pivoted at its lower end to the bottom of the frame A. The frame R carries at its upper end the Jacquard cylinder S, and operates as a lever-frame in the same manner as the lay of a loom.

It will readily be seen that the vertical up-and-down movement of the lifting-frame H will, by means of the arm M, pin $p$, elbow-lever N, pitman O, and arm P, give the frame R the necessary backward and forward motion to carry the cylinder to and from the machine.

In different looms—that is, in looms weaving different kinds of goods—the frame H will have a different amount of rise and fall, while the cylinder S should at all times move in the same distance. This is accomplished by the various adjustments described—i. e., the adjustment of the pin $p$ in the socket $n$, the pin $p^2$ in the different holes in the lever N, and the pitman O in the socket $s$ of the arm P.

The cylinder S is constructed in the usual manner for this class of machines, with pins to carry the card-chain along, and with a ratchet-wheel, $S'$, at one end, operated by an adjustable hinged hook or pawl, $S^2$, to turn the cylinder as it is carried away from the machine by the lever-frame R. The cylinder is at its ends provided with journals $t$ $t$, which rest in bearings formed in the side pieces of the frame R, and held therein by levers T, pivoted to the top of said side pieces, and closing downward on the front thereof. These levers are held at their lower ends by set-screws $v$. By this device for holding the cylinder in its frame the cylinder can be removed at any time, no matter in what position the machine may be.

Figure 5:
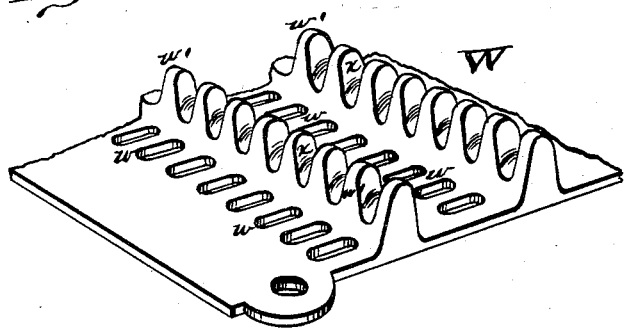
Figure 6:
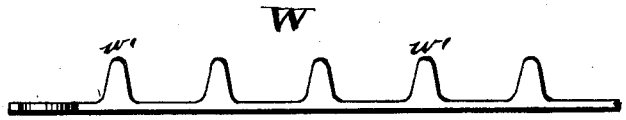

W represents the hook-support fastened on top of the frame C in the main frame. This hook-support may be made in sections of suitable size, of cast-iron, each section formed with a series of rows of slots, $w$ $w$, for the passage of the hooks, and between said rows of slots, on the upper side, are ribs $w'$ $w'$, with notches $x$ $x$ corresponding with the slots $w$, as shown in Fig. 5. The lower ends of the hooks rest in these notches, which prevent the hooks from turning, so as to always be in proper position for the lifting-frame.

The spring box or frame D is also made of cast-iron, in one piece, with suitable longitudinal slots $y$ $y$ for the passage of the rods I I, the springs $f$ bearing against the outer side of said box or frame.

The mortised boards D′ for the passage of the keys $d$ are fastened, by bolts or other suitable means, to the outer side of the box or frame D.

It will be seen that the end pieces of the frame A are slotted, as shown at $b$ $b'$, and the hook-lifting frame has slotted end lugs $x$. By means of these slots the perforated plate B, the hook-supporting frame C, and the hook-lifting frame H can be adjusted with regard to each other, and this adjustment is very necessary to make the lifting-hooks properly engage without binding.

What I claim as new, and desire to secure by Letters Patent, is—

1. As a new article of manufacture, a cast-iron lifting-frame, H, provided with slotted end lugs, $x$, and a series of longitudinal bars, each bar having an inclined rear side, $h$, a narrow horizontal top edge, $h'$, and inclined on the front side from top to $h^2$, and thence rearward again, substantially as shown, and for the purposes hereinbefore set forth.

2. In a Jacquard machine, the combination of the frame R, hinged at its lower end and carrying the cylinder S, the levers T T, pivoted at the top of the frame and closing downward to retain the journals of the cylinder in the frame, and set-screws $v$ for fastening the levers, whereby the cylinder can be removed at any time from the frame, in whatever position the frame may be held, substantially as described.

3. A hook-support having rows of slots for the passage of the hooks, and in rear of said slots, on the upper side, notched ribs for the lower ends of the bent hooks, for the purpose of preventing the hooks from turning and of keeping them in proper position for the lifting-frame.

In testimony that I claim the above I have hereunto subscribed my name in the presence of two witnesses.

WILLIAM P. UHLINGER.

Witnesses:
 A. H. SHOEMAKER,
 A. A. HODKINSON.